(12) United States Patent
Cote et al.

(10) Patent No.: US 6,923,938 B2
(45) Date of Patent: Aug. 2, 2005

(54) HAND-HELD PIPETTOR

(75) Inventors: Richard Cote, Sudbury, MA (US);
Robert Henry Zier, Annapolis, MD (US)

(73) Assignee: Matrix Technologies Corporation, Hudson, NH (US)

( * ) Notice: Subject to any disclaimer, the term of this patent is extended or adjusted under 35 U.S.C. 154(b) by 261 days.

(21) Appl. No.: 10/271,867

(22) Filed: Oct. 16, 2002

(65) Prior Publication Data

US 2003/0099578 A1 May 29, 2003

Related U.S. Application Data

(60) Provisional application No. 60/329,704, filed on Oct. 16, 2001, and provisional application No. 60/329,706, filed on Oct. 16, 2001.

(51) Int. Cl.$^7$ .................................................. B01L 3/02
(52) U.S. Cl. ...................... 422/100; 73/864; 73/863.32; 73/864.01; 73/864.02; 73/864.11; 73/864.13; 73/864.14; 73/864.16; 73/864.18
(58) Field of Search ...................... 422/100; 73/863.32, 73/864, 864.01, 864.02, 864.11, 864.13, 864.14, 864.16, 864.18

(56) References Cited

U.S. PATENT DOCUMENTS

| | | |
|---|---|---|
| 3,142,719 A | 7/1964 | Farr |
| 3,197,285 A | 7/1965 | Rosen |
| 3,732,735 A | 5/1973 | Cohen |
| 3,754,687 A | 8/1973 | Norton |
| 3,767,364 A | * 10/1973 | Ritchie et al. ................. 10/271 |
| 3,769,178 A | 10/1973 | Rothermel, Jr. |
| 3,558,014 A | 1/1974 | Wood et al. |
| 3,786,683 A | 1/1974 | Berman et al. |
| 3,827,305 A | 8/1974 | Gilson et al. |
| 3,853,012 A | 12/1974 | Scordato et al. |

(Continued)

FOREIGN PATENT DOCUMENTS

| | | |
|---|---|---|
| FR | 2071052 | 9/1971 |
| JP | 03186353 | 8/1991 |
| WO | WO 91/05609 | 5/1991 |
| WO | WO 01/57490 | 8/2001 |
| WO | WO 02/00345 | 1/2002 |

OTHER PUBLICATIONS

"A Fast and Low–Volume Pipettor with Integrated Sensors for High Precision," 2000 IEEE, pp. 409–413.

"The Automatic Pipette," American Diagnostica, May 2001.

Handi–Pet Pipetting Gun, General Diagnostics, Mar. 1973.

Eppendorf EDOS 5221, Instructions Manuel, Eppendorf, Germany, No Date.

Photocopy of transparency shown in presentation referred to in DX above.

*Primary Examiner*—Jill Warden
*Assistant Examiner*—Brian R. Gordon
(74) *Attorney, Agent, or Firm*—Gauthier & Connors, LLP

(57) ABSTRACT

A hand-held pipettor comprising a piston received in one end of a cylinder, a pipettor tip removably secured to an opposite end of said cylinder, means for reciprocating said piston through a selected stroke to aspirate fluid into and to expel the thus aspirated fluid from said pipettor tip, mutually spaced stop members operatively associated with said manually driven means for defining the range of said stroke and motor driven means for varying the spacing between said stop members to thereby vary the volume of fluid being aspirated into and expelled from said pipettor tip.

11 Claims, 3 Drawing Sheets

U.S. PATENT DOCUMENTS

| | | | |
|---|---|---|---|
| 3,915,651 A | 10/1975 | Nishi | |
| 3,918,308 A | 11/1975 | Reed | |
| 3,933,048 A | 1/1976 | Scordato | |
| 3,954,014 A | 5/1976 | Andrews, Jr. et al. | |
| 3,991,617 A | 11/1976 | Marteau d'Autry | |
| 4,009,611 A | 3/1977 | Koffer et al. | |
| 4,151,750 A | 5/1979 | Suovaniemi et al. | |
| 4,164,870 A | 8/1979 | Scordato et al. | |
| 4,197,735 A | 4/1980 | Munzer et al. | |
| 4,257,267 A | 3/1981 | Parsons | |
| 4,283,950 A | 8/1981 | Tervamaki | |
| 4,345,483 A | 8/1982 | Paletta et al. | |
| 4,369,665 A * | 1/1983 | Citrin | 73/864.18 |
| 4,399,711 A | 8/1983 | Klein | |
| 4,399,712 A * | 8/1983 | Oshikubo et al. | 73/864.16 |
| 4,433,795 A | 2/1984 | Maiefski et al. | |
| 4,470,317 A | 9/1984 | Sabloewski et al. | |
| 4,489,618 A | 12/1984 | Meyer | |
| 4,517,850 A | 5/1985 | Wiseman et al. | |
| 4,519,258 A * | 5/1985 | Jakubowicz | 73/864.16 |
| 4,563,907 A | 1/1986 | Johnson, Jr. et al. | |
| 4,567,780 A | 2/1986 | Oppenlander et al. | |
| 4,586,546 A | 5/1986 | Mezei et al. | |
| RE32,210 E | 7/1986 | D'Autry | |
| 4,616,514 A | 10/1986 | Magnussen, Jr. et al. | |
| 4,671,123 A * | 6/1987 | Magnussen et al. | 73/864.16 |
| 4,763,535 A | 8/1988 | Rainin et al. | |
| 4,790,176 A | 12/1988 | Marteau d'Autry | |
| 4,801,434 A * | 1/1989 | Kido et al. | 422/100 |
| 4,821,586 A | 4/1989 | Scordato et al. | |
| 4,824,642 A | 4/1989 | Lyman et al. | |
| 4,896,270 A | 1/1990 | Kalmakis et al. | |
| 4,909,991 A | 3/1990 | Oshikubo | |
| 4,965,050 A | 10/1990 | Jessop | |
| 4,967,604 A | 11/1990 | Arpagaus et al. | |
| 4,988,481 A * | 1/1991 | Jarvimaki et al. | 422/100 |
| 4,995,532 A | 2/1991 | Knodel | |
| 4,999,164 A | 3/1991 | Puchinger et al. | |
| 5,002,737 A | 3/1991 | Tervamaki | |
| 5,012,682 A | 5/1991 | Sabloewski et al. | |
| 5,018,394 A * | 5/1991 | Gilson | 73/864.18 |
| 5,090,255 A | 2/1992 | Kenney | |
| 5,104,625 A | 4/1992 | Kenney | |
| 5,187,990 A | 2/1993 | Magnussen, Jr. Haakon T. et al. | |
| 5,192,511 A | 3/1993 | Roach | |
| 5,320,810 A | 6/1994 | Al-Mahareeq et al. | |
| 5,343,769 A | 9/1994 | Suovaniemi et al. | |
| 5,347,878 A * | 9/1994 | Suovaniemi | 73/864.18 |
| 5,364,596 A | 11/1994 | Magnussen, Jr. et al. | |
| 5,389,341 A * | 2/1995 | Tuunanen et al. | 422/100 |
| 5,403,553 A | 4/1995 | Heinonen | |
| 5,406,856 A | 4/1995 | Kuhn | |
| 5,435,197 A | 7/1995 | Telimaa et al. | |
| 5,481,900 A | 1/1996 | Husar | |
| 5,505,097 A | 4/1996 | Suovaniemi et al. | |
| 5,511,433 A | 4/1996 | Sabloewski et al. | |
| 5,531,131 A | 7/1996 | Sabloewski | |
| 5,573,729 A | 11/1996 | Belgardt et al. | |
| 5,591,408 A | 1/1997 | Belgardt et al. | |
| 5,611,784 A | 3/1997 | Barresi et al. | |
| 5,614,153 A | 3/1997 | Homberg | |
| 5,620,660 A | 4/1997 | Belgardt et al. | |
| 5,620,661 A | 4/1997 | Schurbrock | |
| 5,696,330 A | 12/1997 | Heinonen | |
| 5,807,524 A | 9/1998 | Kelly et al. | |
| 5,844,686 A | 12/1998 | Treptow et al. | |
| 5,849,248 A | 12/1998 | Homberg | |
| 5,970,806 A | 10/1999 | Telimaa et al. | |
| 5,983,733 A | 11/1999 | Strandberg et al. | |
| 5,998,218 A | 12/1999 | Conley et al. | |
| 6,074,611 A | 6/2000 | Flesher | |
| 6,090,348 A | 7/2000 | Steele et al. | |
| 6,133,045 A | 10/2000 | Johnson et al. | |
| 6,158,292 A | 12/2000 | Gilson et al. | |
| 6,168,761 B1 | 1/2001 | Kelly et al. | |
| 6,170,343 B1 * | 1/2001 | Conley et al. | 73/864.18 |
| 6,171,553 B1 | 1/2001 | Petrek | |
| 6,182,719 B1 | 2/2001 | Yahiro | |
| 6,197,259 B1 | 3/2001 | Kelly et al. | |
| 6,199,435 B1 | 3/2001 | Wilmer et al. | |
| 6,248,295 B1 | 6/2001 | Petrek | |
| 6,249,717 B1 | 6/2001 | Nicholson et al. | |
| 6,254,826 B1 | 7/2001 | Acosta et al. | |
| 6,254,832 B1 * | 7/2001 | Rainin et al. | 422/100 |
| 6,295,880 B1 | 10/2001 | Gilson | |
| 6,324,925 B1 | 12/2001 | Suovaniemi et al. | |
| 6,532,837 B1 * | 3/2003 | Magussen et al. | 73/864.14 |
| 6,601,433 B2 | 8/2003 | Kriz et al. | |
| 6,715,369 B2 * | 4/2004 | Baba et al. | 73/864.16 |
| 6,749,812 B2 * | 6/2004 | Cronenberg et al. | 422/100 |
| 6,779,412 B2 * | 8/2004 | Viot | 73/864.14 |
| 2002/0001545 A1 * | 1/2002 | Cronenberg et al. | 422/100 |
| 2002/0005075 A1 * | 1/2002 | Kriz et al. | 73/864.18 |
| 2002/0020233 A1 | 2/2002 | Baba et al. | |
| 2003/0082078 A1 * | 5/2003 | Rainin et al. | 422/100 |
| 2003/0147781 A1 * | 8/2003 | Viot | 422/100 |
| 2005/0039550 A1 * | 2/2005 | Uldry et al. | 73/864.18 |

* cited by examiner

HAND-HELD PIPETTOR

CROSS REFERENCE TO RELATED APPLICATIONS

This application claims priority of provisional patent application Ser. Nos. 60/329,704 and 60/329,706, each filed on Oct. 16, 2001.

FIELD OF THE INVENTION

The present invention relates generally to transfer and dispensing devices for liquid reagents and samples, and more particularly to hand-held pipettors.

BACKGROUND OF THE INVENTION

Pipetting systems are widely utilized in laboratories and hospitals for withdrawing and dispensing relatively small, predetermined quantities of liquids from one location to another, such as between test tubes, microplates and other liquid receptacles. Portable, or hand-held, pipettors are one type of pipetting system. Hand-held pipettors generally include a housing, a cylinder including two cylinder ends, with one end positioned within the housing and the other end extending from the housing to form a pipettor tip holder, a piston that moves within the cylinder to withdraw liquid from a supply receptacle and dispense the liquid to a receiving receptacle, and a plunger that drives the piston. While not a permanent part of the pipettor, a disposable pipettor tip is commonly attached to the end of the tip holder to retain the liquid to be transferred. This tip can be removed from the tip holder, disposed of, and replaced with a new tip. These hand-held pipettors may be configured to transfer liquids by automated or manual actuation of the pipettor. Automatically operated hand-held pipettors generally include a motor for actuating the plunger to move the piston within the pipettor cylinder for liquid transfer. Manually operated hand-held pipettors require the pipettor user to apply force to the plunger head, usually with a thumb or a finger, to actuate the piston.

Hand-held pipettors may be designed as fixed volume pipettors, where only one predetermined liquid volume is withdrawn and dispensed, or as adjustable pipettors, where the user may set a desired volume to be dispensed within a given volume range. Stop features located within a pipettor determine the distance that a piston will travel, also known as the stroke. The stroke corresponds to the volume of liquid to be withdrawn and dispensed. Hand-held pipettors commonly include two stops to establish the limits of the stroke. For purposes of the foregoing description, these two stops will be referred to as a front stop and a rear stop. In this description, the front stop is the stop closest to the tip holder and the rear stop is the stop closest to the plunger head, or in a manual pipettor, the end of the plunger that is manually actuated by a pipettor user. The stops in a fixed volume pipettor are fixed, and the piston travels the same stroke during each complete actuation of the plunger. In an adjustable volume pipettor, at least one of the stops is movable to adjust the stroke length of the piston, and thus the volume to be withdrawn and dispensed.

In manual pipettor applications where the volume of liquid to be transferred may vary frequently within a single application, the pipettor user must frequently change the volume settings on the pipettor, which can cause fatigue and potentially inaccurate volume settings on the pipettor.

SUMMARY OF THE INVENTION

In one embodiment of the invention, a hand-held pipettor comprises a housing including a front stop and a rear stop, a cylinder, a piston that moves within the cylinder to draw and expel liquid, and a plunger that moves the piston, the rear stop being movable by a motor to adjust the volume of liquid to be aspirated and dispensed by the pipettor.

In another embodiment of the invention, the pipettor includes a voice recognition system that coacts with a central processing unit to translate verbal commands for volume settings into electronic signals that control the motor moving the rear stop.

In another embodiment, a hand-held pipettor for dispensing specific liquid volumes comprises a cylinder having one end defining a tip holder that accepts a disposable pipettor tip, a piston that moves within the cylinder to withdraw and dispense liquid, and a manually actuated plunger that moves the piston to at least one point of resistance, the housing containing a tactile blow-out mechanism that facilitates manual expelling of a remnant liquid in the pipettor tip following the dispensing of specified liquid volumes. The blow-out mechanism requires the pipettor user to apply a force to the plunger through a first point of resistance to a second point of resistance to expel remnant liquid from the pipettor tip.

In a further embodiment, a hand-held pipettor for pipetting applications comprises a cylinder having and end configured and arranged to accept a disposable pipettor tip, a piston that moves within the cylinder to withdraw and dispense liquid, a plunger that moves the piston, and a manually actuatable tip ejector assembly configured and arranged to dislodge the pipettor tip for disposal following a pipetting application.

These and other features and advantages of the present invention will now be described in greater detail with reference to the accompanying drawings, wherein:

DETAILED DESCRIPTION

Figure 1:
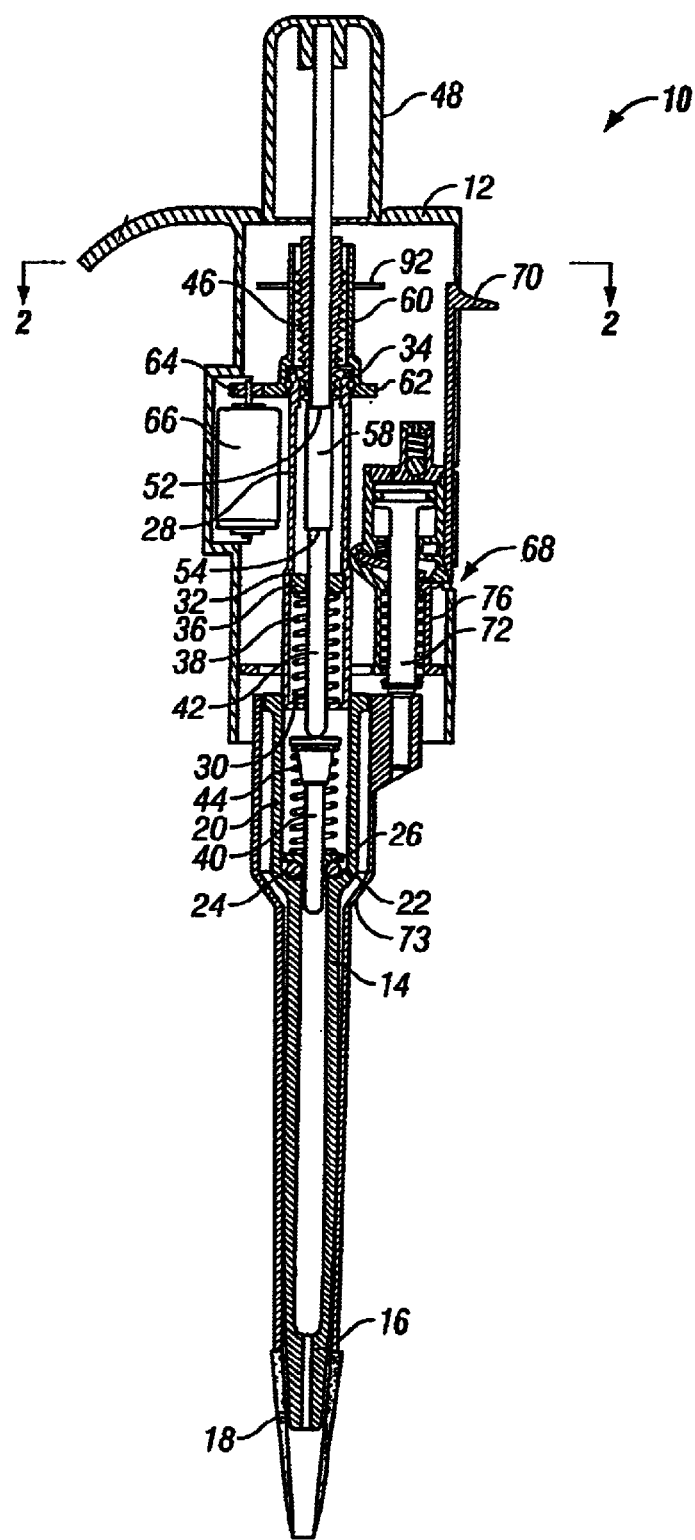
FIG. 1 is a vertical sectional view taken through a manual hand-held pipettor in accordance with the present invention.

A pipettor in accordance with the present invention is generally indicated at 10 in FIG. 1. The pipettor includes a housing 12 with an axially projecting cylinder 14. Cylinder 14 has a tapered distal end defining a pipettor tip holder 16. A pipettor tip 18 is removably secured by friction to the tip holder 16. The opposite end of the cylinder has an enlarged head 20 with an internal ledge 22 on which is seated an O-ring 24 supporting an apertured seal 26. A sleeve 28 has an apertured lower end 30 received in the cylinder head 20. The sleeve 28 has an intermediate interior shoulder 32 and an internally threaded open upper end 34. A front stop collar 36 is biased upwardly against the internal shoulder 32 by a spring 38.

A piston 40 in the cylinder head 20 projects downwardly through the seal 26. The piston is biased upwardly against the lower end of a plunger 42 by a main spring 44. Plunger 42 extends upwardly through the apertured lower end 30 of sleeve 28, and through the front stop collar 36 and a tubular externally threaded screw 46, with its upper end projecting from the top of the housing 12 and into an axially depressable cap 48.

An enlarged intermediate section 58 of the plunger 42 defines upper and lower shoulders 52 and 54. Shoulder 52 is biased against the lower end of the screw 46 by the force of the main spring 44 acting on the piston 40. The lower screw end thus serves as a rear stop.

Figure 2:
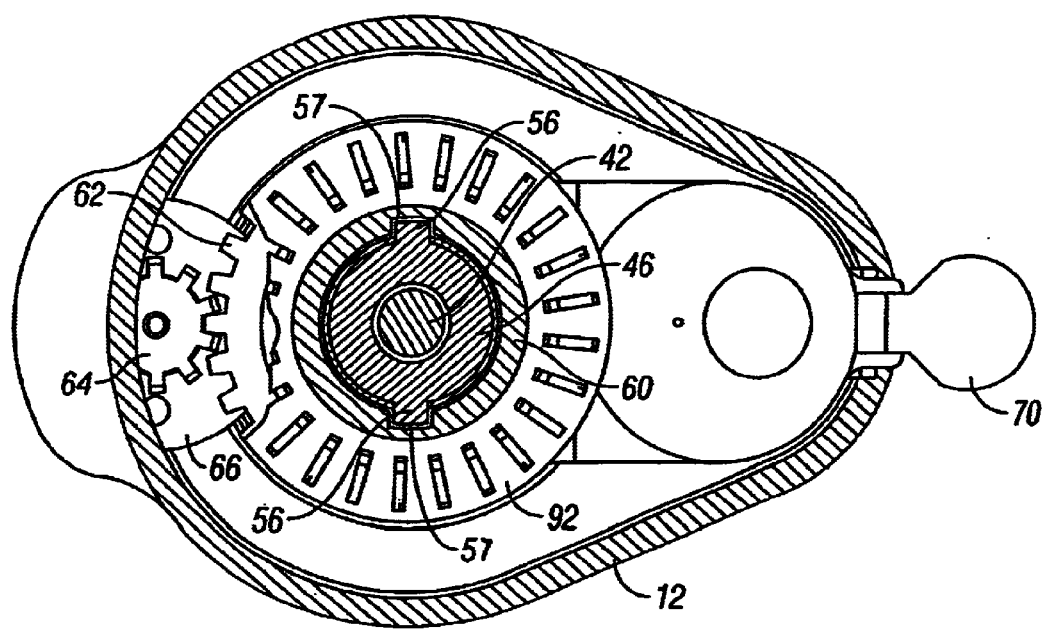
FIG. 2 is a horizontal sectional view on an enlarged scale taken along line 2—2 of FIG. 1.

As can best be seen by additional reference to FIG. 2, the upper end of the screw 46 is provided with external ribs 56 slidably received in internal grooves 57 in a rotatable drive collar 60. An external gear 62 on the drive collar 60 meshes with a drive pinion 64 on the output shaft of a motor 66.

Actuation of motor 66 will cause the drive collar 60 to rotate, and the mechanical interengagement of the ribs 56 and grooves 57 will result in a corresponding rotation being imparted to the screw 46. The threaded engagement of the screw 46 with the upper end 34 of the fixed sleeve 28 will result in the screw being shifted axially to a desired setting of its lower end, which provides a rear stop for the plunger 42 and the piston 40 biased agains its lower end by the main spring 44.

The setting of the rear stop will limit the extent to which the piston 40 can be retracted from the tubular portion of the cylinder 14, which in turn will control the volume of liquid that can be drawn into the pipettor tip 18 during aspiration.

Aspirated liquid is dispensed from the pipettor tip by manually depressing the cap 48 to advance the plunger 42 and the piston 40 against the biasing force of the main spring 44. The plunger will continue to advance until the lower shoulder 54 of its enlarged intermediate section 58 engages the front stop 36, creating a first point of resistance which indicates that most of the aspirated liquid has been dispensed. By manually applying additional force to the plunger 42 in order to overcome the resistance of spring 38, the piston will be advance further to insure that any residual liquid will be "blown out" of the pipettor tip 18.

Figure 3:
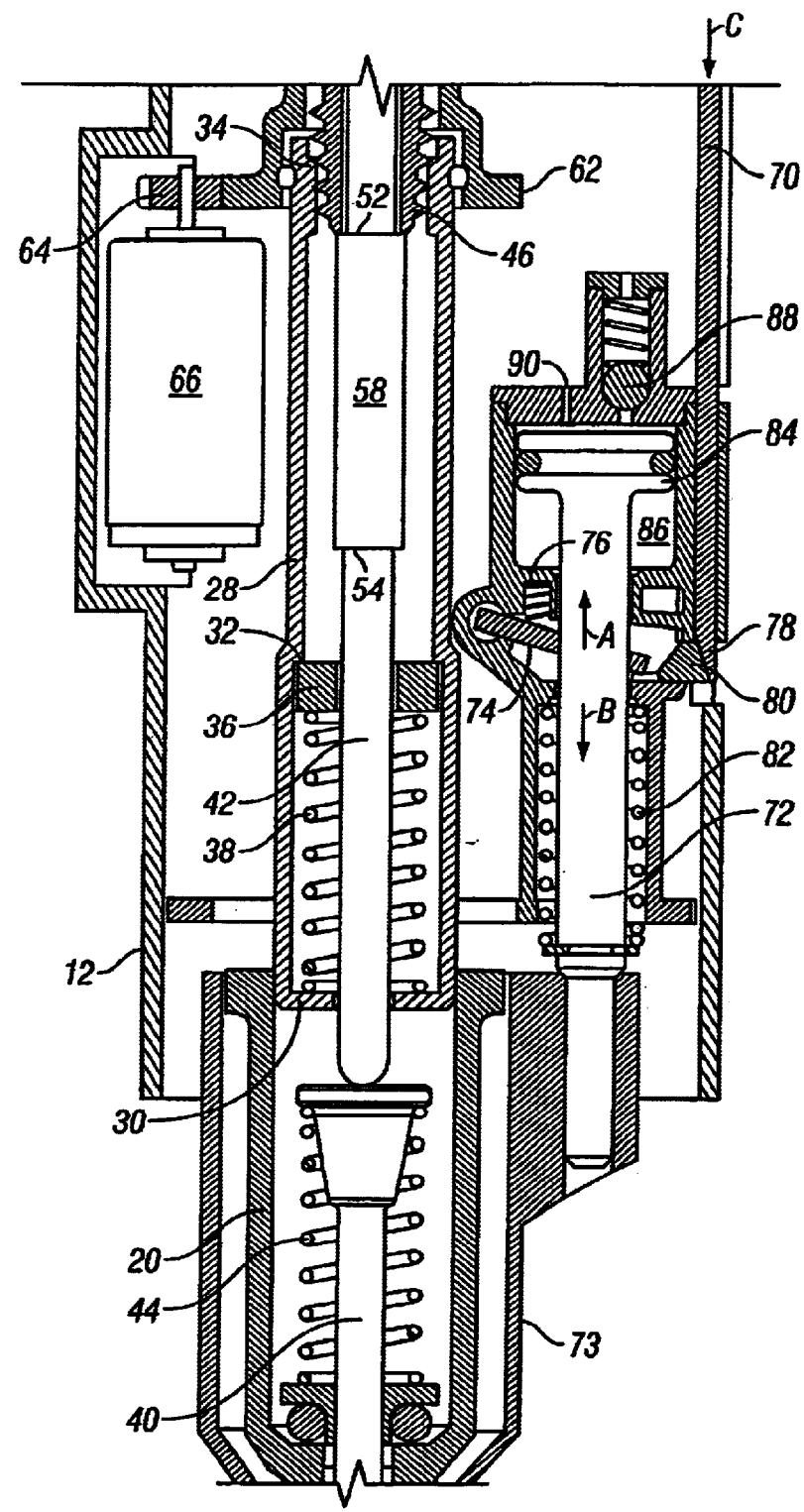
FIG. 3 is an enlarged view of a portion of FIG. 1.

In another aspect of the invention, the pipettor includes a tip ejector assembly generally indicated at 68 for removing a pipettor tip 18 from the pipettor tip holder 16. As can best be seen by a combined reference to FIGS. 1 and 3, the tip ejector assembly 68 includes a tip ejector actuator 70, a tip ejector shaft 72, a tip ejector sleeve 73 movable with the tip ejector shaft, and a lock collar 74. The lock collar allows one way movement of the tip ejector shaft 72 and sleeve 73 in the direction of arrow A in FIG. 3, but does not allow movement of these components in the opposite direction, the direction of arrow B, when the lock collar is oriented in its locking position, as illustrated. Therefore, when a disposable tip 18 is wedged upwardly onto the tip holder 16, the tip ejector sleeve 73 is pushed upwardly in the direction of arrow A. At the same time, the tip ejector shaft 72 will also move up a distance equal to the distance traveled by the tip ejector sleeve due to the fixed connection therebetween. The lock collar 74 will allow movement of the tip ejector shaft 72 in the direction of arrow A without resisting movement. However, the tip ejector shaft 72 will be prevented from moving in direction B toward the disposable tip 18 by the locking action of the lock collar 74.

A spring 76 is positioned to bias the lock collar into an angled, or locking position. The spring 76 keeps the tip ejector shaft 72 locked by the lock collar 74, and thus prevents the tip ejector shaft and the ejector sleeve 73 from moving in the direction of arrow B to dislodge and eject the pipettor tip 18.

Depressing the tip ejector actuator 70 in the direction of arrow C will cause its tapered lower end 78 to coact with a mating inclined surface of a ramp wedge 80, causing the ramp wedge to shift in the direction of the lock collar, and creating a force lifting the lock collar from its angled locked position to a raised unlocked position. Once the lock collar is unlocked, the tip ejector shaft is released to move through the lock collar in the direction of arrow B under the force of spring 82. The tip ejector sleeve 73 will be correspondingly moved, causing the pipettor tip 18 to be dislodged and ejected from the end of the pipettor tip holder 16.

In another embodiment of the invention, a damper mechanism includes a piston 84 formed at the upper end of the tip ejector shaft 72. The piston is encircled by an O-ring seal and enclosed in a chamber 86 vented to atmosphere by a one way check valve 88. Movement of the tip ejector shaft in direction A causes air to be expelled from the chamber 86 via the check valve, whereas movement in direction B is retarded by the rate at which air can be readmitted to the chamber via a smaller bleed hole 90. The retarded rate of travel in direction B beneficially retards the velocity at which the pipettor tip is ejected.

Figure 4:
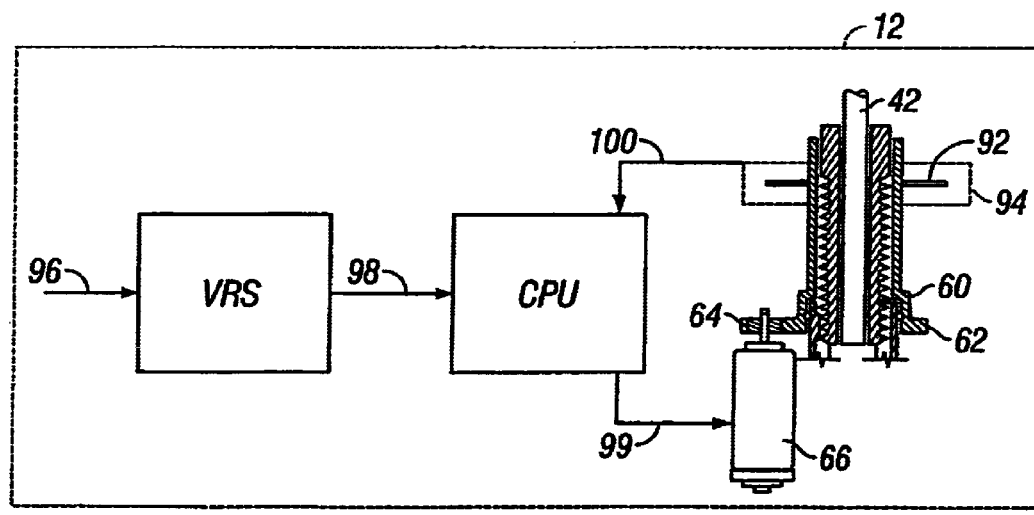
FIG. 4 is a schematic diagram of the voice recognition system.

In another embodiment of the invention, as can be seen by reference to FIGS. 2 and 4, the adjustment drive collar 60 is surrounded by an encoder wheel 92 that rotates with the adjustment drive collar and that comprises part of an encoder assembly 94. The pipettor includes a voice recognition system VRS that translates verbal commands 96 for volume settings and outputs the result 98 to a central processing unit CPU. The CPU generates an electronic signal 99 that controls the motor 66, and may optionally receive input 100 from the encoder assembly 94 indicative of the position of the adjustable stop. The pipettor's adjustment mechanism is thus moved automatically to the position corresponding to the voice input setting.

In light of the foregoing, it will be understood by those skilled in the art that although the present invention has been described with reference to a pipettor having a manually actuated piston, certain aspects of the invention including the motor driven stop adjustment mechanism, the voice recognition system, and the tip ejection mechanism, are also applicable to pipettors having motor driven pistons.

Modifications and improvements within the scope of the present invention will become apparent to those skilled in the art. The above description is intended to be purely illustrative, and does not define the limits of the present invention.

We claim:

1. A hand-held pipettor comprising:
   a piston received in one end of a cylinder;
   a pipettor tip removably secured to an opposite end of said cylinder;
   manually driven means for reciprocating said piston through a selected stroke to aspirate fluid into and to expel the thus aspirated fluid from said pipettor tip;
   mutually spaced stop members operatively associated with said manually driven means for defining the range of said stroke;
   a voice recognition system that decodes verbal commands and outputs the result to a central processing unit, which in turn generates control signals; and
   motor driven means for varying the spacing between said stop members to thereby vary the volume of fluid being aspirated into and expelled from said pipettor tip, said motor driven means including a drive motor mechanically coupled to one of said stop members, said drive motor being operative in response to electronic drive signals.

2. The hand-held pipettor of claim 1 further comprising an encoder assembly associated with said drive motor and operative to generate feedback signals to said central processing unit indicative of the position of the said one stop member.

3. The hand-held pipettor of claim 1 further comprising a sleeve surrounding and axially shiftable on said cylinder, said sleeve being urged in one direction into a retracted position by the pipettor tip removably secured to the said opposite end of said cylinder, and being shiftable in the opposite direction to dislodge said pipettor tip from said cylinder.

4. The hand-held pipettor of claim 3 further comprising spring means for resiliently shifting said sleeve in the opposite direction.

5. The hand-held pipettor of claim 4 further comprising lock means for accommodating movement of said sleeve in the said one direction, and for preventing movement of said sleeve in the said opposite direction, and manually operable means for releasing said lock means to accommodate the resilient shifting of said sleeve in the said opposite direction.

6. The hand-held pipettor of claims 4 or 5 further comprising pneumatic means for retarding the rate of movement of said sleeve in the opposite direction.

7. A hand-held pipettor comprising:

a piston received in one end of a cylinder;

a pipettor tip removably secured to an opposite end of said cylinder;

manually driven means for reciprocating said piston through a selected stroke to aspirate fluid into and to expel the thus aspirated fluid from said pipettor tip;

mutually spaced members operatively associated with said manually driven means for defining a range of said stroke;

motor driven means for varying the spacing between said stop members to thereby vary the volume of fluid being aspirated into and expelled from said pipettor tip;

a sleeve surrounding and axially shiftable on said cylinder, said sleeve being urged in one direction into a retracted position by the pipettor tip removable secured to the said opposite end of said cylinder, and being shiftable in the opposite direction to dislodge said pipettor tip from said cylinder;

spring means for resiliently shifting said sleeve in the opposite direction;

lock means for accommodating movement of said sleeve in the said one direction, and for preventing movement of said sleeve in the said opposite direction, and manually operable means for releasing said lock means to accommodate the resilient shifting of said sleeve in the said opposite direction; and pneumatic means for retarding the rate of movement of said sleeve in the opposite direction.

8. The hand-held pipettor of claim 7 wherein said motor driven means comprises a drive motor mechanically coupled to one of said stop members, said drive motor being operative in response to electronic drive signal.

9. The hand-held pipettor of claim 7 further comprising an encoder assembly associated with said drive motor and operative to generate feedback signals to said central processing unit indicative of the position of the said one stop member.

10. A hand-held pipettor comprising:

a piston received in one end of a cylinder;

a pipettor tip removably secured to an opposite end of said cylinder;

a manually driven plunger that is depressible to reciprocate said piston through a selected stroke to thereby aspirate fluid into and to expel the thus aspirated fluid from said pipettor tip;

mutually spaced stop members associated with said manually driven plunger to define together with the piston a range of the stroke;

a voice recognition and processing system that receives verbal commands and provides motor control signals; and a motor that receives the motor control signals and includes a motor shaft that may be rotated responsive to the motor control signals to vary the range of the stroke defined by the mutually spaced stops and the piston to thereby vary the volume of fluid being aspirated into and expelled from said pipettor tip.

11. The hand-held pipettor of claim 10 wherein said motor shaft is mechanically coupled to one of said stop members.

* * * * *

UNITED STATES PATENT AND TRADEMARK OFFICE
CERTIFICATE OF CORRECTION

PATENT NO. : 6,923,938 B2
DATED : August 2, 2005
INVENTOR(S) : Richard Cote et al.

It is certified that error appears in the above-identified patent and that said Letters Patent is hereby corrected as shown below:

Column 4,
Line 54, please delete "the range" and replace with -- a range --.

Column 5,
Line 39, delete "removable" and replace with -- removably --.

Signed and Sealed this

Twenty-seventh Day of September, 2005

JON W. DUDAS
*Director of the United States Patent and Trademark Office*